United States Patent
Box

(10) Patent No.: US 12,236,449 B2
(45) Date of Patent: *Feb. 25, 2025

(54) SYSTEMS AND METHODS FOR DYNAMIC LINK REDIRECTION

(71) Applicant: rewardStyle, Inc., Dallas, TX (US)

(72) Inventor: Baxter Murrell Box, Dallas, TX (US)

(73) Assignee: rewardStyle, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/664,978

(22) Filed: May 15, 2024

(65) Prior Publication Data

US 2024/0303689 A1    Sep. 12, 2024

Related U.S. Application Data

(63) Continuation of application No. 17/810,921, filed on Jul. 6, 2022, now Pat. No. 12,020,281.

(51) Int. Cl.
*G06Q 30/00* (2023.01)
*G06Q 30/0241* (2023.01)
*G06Q 30/0242* (2023.01)

(52) U.S. Cl.
CPC ..... *G06Q 30/0243* (2013.01); *G06Q 30/0276* (2013.01)

(58) Field of Classification Search
CPC .................. G06Q 30/0243; G06Q 30/0276
See application file for complete search history.

(56) References Cited

U.S. PATENT DOCUMENTS

| 7,987,491 B2 | 7/2011 | Reisman |
| 8,027,883 B2 | 9/2011 | Donaldson |

(Continued)

FOREIGN PATENT DOCUMENTS

EP    3109810 A1    12/2016

OTHER PUBLICATIONS

"How We Did It: Oops! Quick-Fixing Links," Hassler, Carol. Computers in Libraries34.6: 9-11. Information Today, Inc. (Jul./Aug. 2014) Dialog #1554332206, 3pgs. (Year: 2014).*

(Continued)

*Primary Examiner* — Robert M Pond
(74) *Attorney, Agent, or Firm* — Bookoff McAndrews, PLLC

(57) ABSTRACT

A computer-implemented method for dynamic link redirection includes receiving a request to display online content to a user, determining a plurality of current content links in the online content, for each current content link among the plurality of current content links, performing operations including: obtaining current assessment parameters for the current content link, generating a current assessment for the current content link based on the current assessment parameters, obtaining a plurality of alternative content links based on the current content link, generating a plurality of alternative assessments for each alternative content link among the plurality of alternative content links based on respective alternative assessment parameters for the alternative content link, determining a selected content link among the plurality of alternative content links based on the current assessment and the plurality of alternative assessments, replacing the current content link in the online content with the selected content link, and displaying the online content to the user.

20 Claims, 6 Drawing Sheets

(56) References Cited

U.S. PATENT DOCUMENTS

| | | |
|---|---|---|
| 8,224,715 B2 | 7/2012 | Kumar |
| 8,301,747 B2 | 10/2012 | Schweier |
| 9,075,777 B1 | 7/2015 | Pope et al. |
| 10,402,845 B2 | 9/2019 | Glazier |
| 11,238,480 B1 | 2/2022 | Nakhuda |
| 2008/0097843 A1 | 4/2008 | Menon |
| 2008/0208682 A1 | 8/2008 | Chandley |
| 2011/0131098 A1 | 6/2011 | Bafia et al. |
| 2011/0258049 A1 | 10/2011 | Ramer et al. |
| 2012/0173692 A1 | 7/2012 | Lakes et al. |
| 2013/0159826 A1 | 6/2013 | Mason |
| 2013/0262971 A1 | 10/2013 | Stoliartchouk |
| 2014/0019248 A1 | 1/2014 | Stoliartchouk et al. |
| 2014/0019266 A1 | 1/2014 | Stoliartchouk et al. |
| 2014/0019267 A1 | 1/2014 | Stoliartchouk |
| 2014/0156437 A1 | 5/2014 | Baran |
| 2016/0173693 A1 | 6/2016 | Spievak |
| 2017/0208025 A1 | 7/2017 | Chakra et al. |
| 2018/0322536 A1 | 11/2018 | Zhang |

OTHER PUBLICATIONS

International Search Report in PCT/US2023/069348, dated Sep. 7, 2023, (3 pages).

* cited by examiner

SYSTEMS AND METHODS FOR DYNAMIC LINK REDIRECTION

CROSS-REFERENCE TO RELATED APPLICATION(S)

This non-provisional patent application is a continuation of and claims the benefit of priority to U.S. Nonprovisional patent application Ser. No. 17/810,921, filed on Jul. 6, 2022, the entirety of which is incorporated herein by reference.

TECHNICAL FIELD

Various embodiments of the present disclosure relate generally to electronic commerce, and in particular, to an affiliate link generation system for use in online marketing and sales.

BACKGROUND

With the rapid evolution of technology in recent years, there has been a growing trend toward online content creation, by businesses, such as online magazine publishers, as well as by individual content creators, such as personal bloggers and influencers. These online content creators frequently review and publish commentary on a variety of products on their web sites and via third-party online social media or social networking sites. Accordingly, online marketing has evolved to include awarding commissions to content creators on sales made to consumers who have arrived at an affiliate's web site through a tracked link in the creator's content. The commission earned by the creator can depend on many factors, including, for example, commission rate, commission duration, retailer stock level, etc.

However, it may be difficult for a content creator to balance the multiple factors to select an affiliate retailer link that will maximize their earned commissions. Moreover, these factors may change over time without notice to the content creator. This may result in the content creator earning less in commissions than they could have earned by incorporating a different affiliate retailer link, and may result in consumer dissatisfaction from being directed to an affiliate retailer that no longer has the product in stock.

In addition, the presence in online content of outdated retailer product links, or links to products no longer in stock at the retailer, may result in additional load on the servers and networks of the retailer, possibly resulting in reduced capacity or responsiveness, and associated costs to the retailer.

The present disclosure is directed to overcoming one or more of these above-referenced challenges.

SUMMARY OF THE DISCLOSURE

According to certain aspects of the present disclosure, systems and methods are disclosed for dynamic link generation.

In one embodiment, a computer-implemented method is disclosed for dynamic link generation, the method comprising: receiving online content from a creator of the online content, determining a plurality of current retailer product links in the online content, for each current retailer product link among the plurality of current retailer product links, performing operations including: obtaining current retailer monetization parameters for the current retailer product link, generating a current retailer monetization assessment for the current retailer product link based on the current retailer monetization parameters, obtaining a plurality of alternative retailer product links based on the current retailer product link, generating a plurality of alternative retailer monetization assessments for each alternative retailer product link among the plurality of alternative retailer product links based on respective alternative retailer monetization parameters for the alternative retailer product link, displaying, to the creator of the online content, the current retailer monetization assessment and the plurality of alternative retailer monetization assessments, receiving, from the creator of the online content, a selected retailer product link among the current retailer product link and the plurality of alternative retailer product links, and replacing the current retailer product link in the online content with the selected retailer product link, and displaying the online content to a consumer or transmitting the online content to the consumer.

In accordance with another embodiment, a system is disclosed for dynamic link generation, the system comprising: a data storage device storing instructions for dynamic link generation in an electronic storage medium; and a processor configured to execute the instructions to perform a method including: receiving online content from a creator of the online content, determining a plurality of current retailer product links in the online content, for each current retailer product link among the plurality of current retailer product links, performing operations including: obtaining current retailer monetization parameters for the current retailer product link, generating a current retailer monetization assessment for the current retailer product link based on the current retailer monetization parameters, obtaining a plurality of alternative retailer product links based on the current retailer product link, generating a plurality of alternative retailer monetization assessments for each alternative retailer product link among the plurality of alternative retailer product links based on respective alternative retailer monetization parameters for the alternative retailer product link, displaying, to the creator of the online content, the current retailer monetization assessment and the plurality of alternative retailer monetization assessments, receiving, from the creator of the online content, a selected retailer product link among the current retailer product link and the plurality of alternative retailer product links, and replacing the current retailer product link in the online content with the selected retailer product link, and displaying the online content to a consumer or transmitting the online content to the consumer.

In accordance with another embodiment, a non-transitory machine-readable medium storing instructions that, when executed by the a computing system, causes the computing system to perform a method for dynamic link redirection, the method including: receiving online content from a creator of the online content, determining a plurality of current retailer product links in the online content, for each current retailer product link among the plurality of current retailer product links, performing operations including: obtaining current retailer monetization parameters for the current retailer product link, generating a current retailer monetization assessment for the current retailer product link based on the current retailer monetization parameters, obtaining a plurality of alternative retailer product links based on the current retailer product link, generating a plurality of alternative retailer monetization assessments for each alternative retailer product link among the plurality of alternative retailer product links based on respective alternative retailer monetization parameters for the alternative retailer product link, displaying, to the creator of the online content, the current retailer monetization assessment and the plurality of alternative retailer monetization assessments, receiving, from the creator of the online content, a selected retailer product link among the current retailer product link and the plurality of alternative retailer product links, and replacing the current retailer product link in the online content with the selected retailer product link, and displaying the online content to a consumer or transmitting the online content to the consumer.

In accordance with another embodiment, a computer-implemented method is disclosed for dynamic link generation, the method comprising: receiving a request to display online content to a consumer, determining a plurality of current retailer product links in the online content, for each current retailer product link among the plurality of current retailer product links, performing operations including, obtaining current retailer monetization parameters for the current retailer product link, generating a current retailer monetization assessment for the current retailer product link based on the current retailer monetization parameters, obtaining a plurality of alternative retailer product links based on the current retailer product link, generating a plurality of alternative retailer monetization assessments for each alternative retailer product link among the plurality of alternative retailer product links based on respective alternative retailer monetization parameters for the alternative retailer product link, determining a selected retailer product link among the plurality of alternative retailer product links based on the current retailer monetization assessment and the plurality of alternative retailer monetization assessments, and replacing the current retailer product link in the online content with the selected retailer product link, and displaying the online content to the consumer.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Various embodiments of the present disclosure relate generally to an affiliate link generation system for use in online marketing and sales. In one or more embodiments, the affiliate link generation system may dynamically redirect retailer product links in online content to alternative retailer product links in order to optimize the monetization of the online content. The redirection may be performed through user interaction, such as in a monetization dashboard, or may be performed autonomously.

Retailer product links in online content may be presented by a creator of the online content. For example, the creator may find a product they want to link to, such as through a creator mobile application provided by a content sharing platform that allows the creator to navigate to a retailer's website, or directly on the retailer's website via, for example, a desktop or mobile browser. The creator may then use a link generator, such as may be provided by the content sharing platform. Alternatively, the creator may search for products in a database, such as may be provided by the content sharing platform, to find a product they want to link to. Either of these methods of finding a product for a retailer product link in online content may trigger a "monetization optimization" recommendation to the creator regarding alternative retailers that may be featured, such as to direct traffic to higher yielding product links. In such a scenario, the creator may make the decision of which retailer product links to feature.

For existing content including retailer product links, content sharing platform may not rely on the creator to view and accept recommendations for alternative product links. For such content, the content sharing platform may dynamically evaluate monetization optimization for each retailer product link in existing on a regular cadence after the content and associated retailer product links are posted for public access, and may route a consumer through an optimal monetization product link dynamically on-click, or may replace the link if an optimal product link is identified prior to click. Such optimization may be more comprehensive given that retailers may change their terms and capabilities, such as commission rate, commission duration, payment system, retailer online experience etc., and consumer purchasing behavior may change over time.

Figure 1:
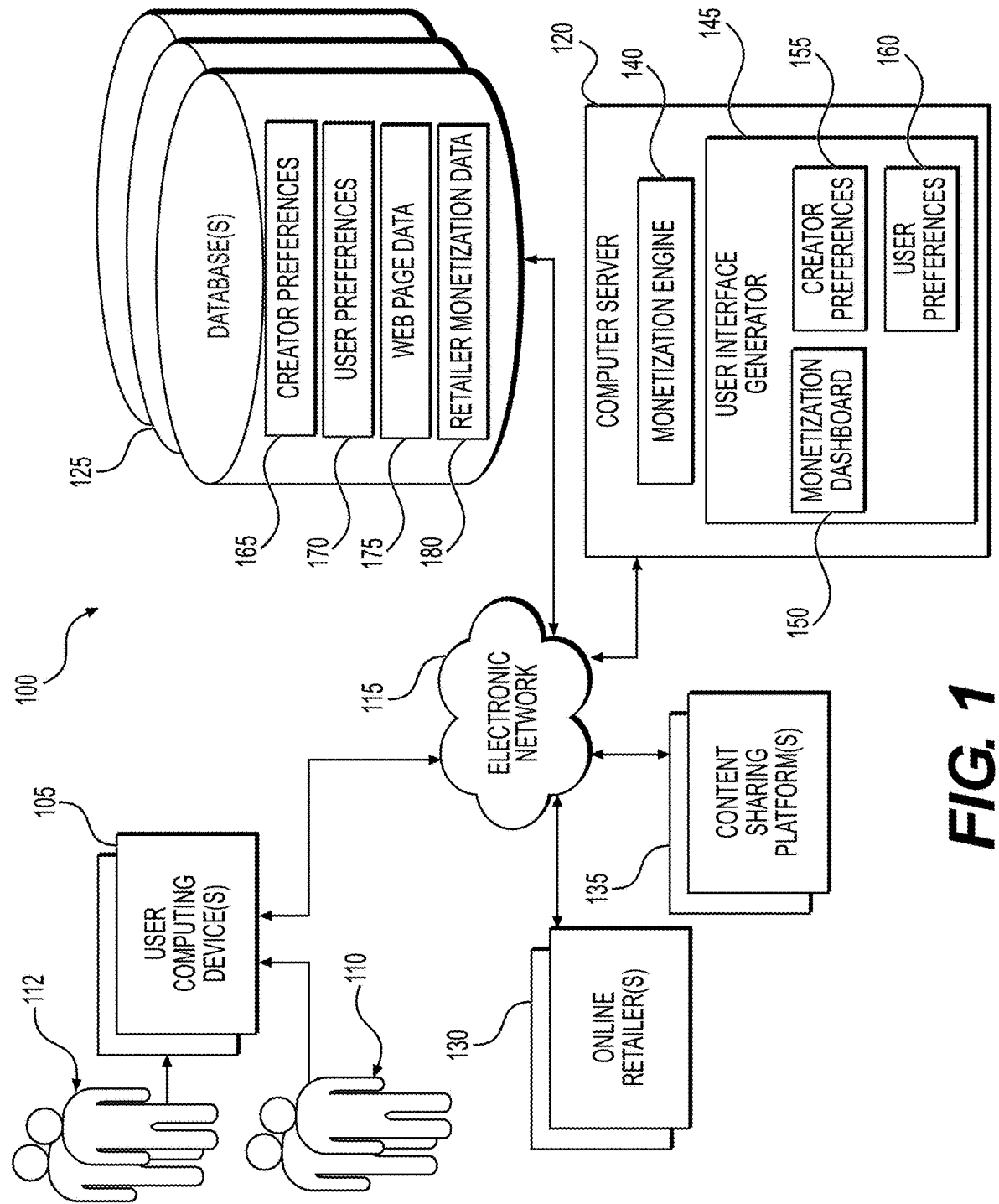
FIG. 1 depicts an exemplary system infrastructure for dynamic link redirection, according to one or more embodiments.
Figure 2:
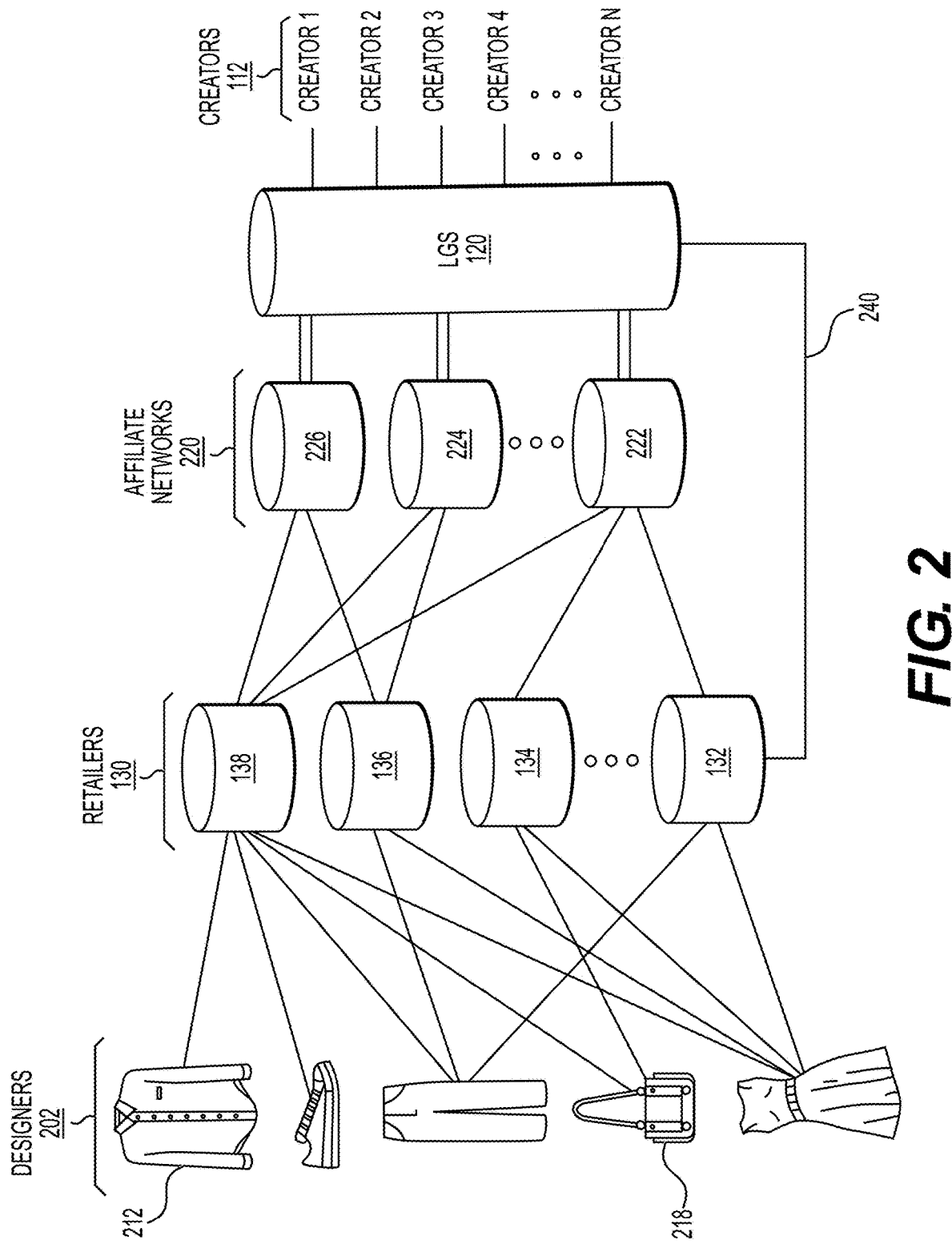
FIG. 2 depicts a relationship diagram highlighting the basic relationship connections among various elements that enable online sales within a system infrastructure for dynamic link redirection, according to one or more embodiments.

Any suitable system infrastructure may be put into place to allow dynamic link generation. FIGS. 1 and 2 and the following discussion provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIG. 1.

FIG. 1 is an exemplary block diagram of a system architecture environment 100 for dynamic link redirection, according to one or more embodiments. The system architecture environment 100 may include one or more user computing devices 105 operated by consumers 110 or content creators 112, an electronic network 115, a computer server 120, one or more databases 125, one or more online retailers 130, and one or more content sharing platforms 135. One of skill in the art would recognize that the server 120 may configure the one or more user computing devices 105 to perform different functionalities and/or have access to different information (e.g., determined by credentials such as user ID/password).

Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

The user device 105, the server 120, the databases 125, the one or more online retailers 130, and/or the one or more content sharing platforms 135 may be connected via the network 115 using one or more standard communication protocols. Consumers 110 may include consumers who browse and shop for products on a consumer shopping application (e.g., consumer application) generated by the computer server 120. Content creators 112 may create and upload content to content sharing platforms 135 to share their content with viewers. For example, content creators may include social media influencers or bloggers.

The network 115 may comprise one or more networks that connect devices and/or components of environment 100 to allow communication between the devices and/or components. For example, the network 115 may be implemented as the Internet, a wireless network, a wired network (e.g., Ethernet), a local area network (LAN), a Wide Area Network (WANs), Bluetooth, Near Field Communication (NFC), or any other type of network that provides communications between one or more components of environment 100. In some embodiments, the network 115 may be implemented using cell and/or pager networks, satellite, licensed radio, or a combination of licensed and unlicensed radio. The network 115 may be associated with a cloud platform that stores data and information related to methods disclosed herein.

The online retailers 130 may include retailers that sell products online (e.g., through a website and/or application). The content sharing platforms 135 may include content sharing or social media networking websites, including, but not limited to, Instagram, Facebook, Twitter, Pinterest, YouTube, Snapchat, TikTok, and LTK, which allow content creators to post user-generated or acquired images, comments, videos, and/or reels, and browse through and interact with content created by other content creators. The content sharing platforms 135 may include the consumer application generated by the computer server 120. In other embodiments, the content sharing platforms 135 may include blogs, content feeds, and/or content streams.

Consumers 110 and content creators 112 may communicate with the computer server 120 via the user computing devices 105. For example, consumers 110 may view online content posted by content creators 112 and may shop for products using affiliate retailer links embedded in the posted online content. Content creators 112 may edit and upload posted content. Consumers 110 and content creators 112 may modify preference settings, such as will be described in greater detail below. Online retailers 130 may provide information about monetization parameters, such as, for example, commission rate, commission duration, stock level, product or category level availability for commission, such as, for example, a product or category of product that may not be commissionable or may have a different commission rate, pay per click, i.e., what the retailer would pay if a consumer clicks on the link to the retailer, regional, language support, etc. However, online retailer monetization parameters may also be gathered by other means. Data associated with consumer viewing and shopping, content editing and upload, user and creator preferences, retailer monetization, etc., may be transmitted to the computer server 120, which may subsequently store the received data in the databases 125. For example, data may be stored in creator preferences 165, user preferences 170, web page data 175, or retailer monetization data 180. The user computing device 105 may be a computer, a cell phone, a tablet, etc. The user computing device 105 may execute, by a processor (not shown), an operating system (O/S) and at least one application stored in a memory of the user computing device 105 (not shown). In one example, such an application may be associated with the computer server 120 and may be downloaded by content creators 112 onto their user computing device 105 to manage retailer links in posted online content and the associated monetization parameters, such as, for example, through interactive graphic user interfaces (GUIs), as described in detail below with respect to FIGS. 5 and 6.

The application may be a browser program or a mobile application program (which may also be a browser program in a mobile O/S). The application may generate one or more interactive graphic user interfaces (GUIs) based on instructions/information received from the server 120. In some embodiments, the application may generate one or more interactive GUIs based on instructions/information stored in the memory. The interactive GUIs may be application GUIs for the application executed based on XML and Android programming languages or Objective-C/Swift, but one skilled in the art would recognize that this may be accomplished by other methods, such as webpages executed based on HTML, CSS, and/or scripts, such as JavaScript.

Retailer monetization data 180 may include a default commission rate and commission duration for each retailer, as well as, for each registered product carried by the retailer, a product-specific commission rate and commission duration, retailer stock level, etc. The commission rate and commission duration may be a single rate and duration, such as 10% for ten days, or may be multiple rates applying to multiple time frames, such as 20% for five days and 5% for 20 days. Retailer monetization data 180 may further include data regarding past customer transactions, including product information, creator content information, such as the referenced online creator content and the retailer link used by the customer to initiate the transaction, associated past retailer monetization data, predicted assessments, scores, or grades at the time the creator content was posted or last updated, and resulting creator commissions.

The computer server 120 may have one or more processors configured to perform methods described in this disclosure. The computer server 120 may include one or more modules, models, or engines. The one or more modules, models, or engines may include a monetization engine 140 and user interface generator 145. The monetization engine 140 may generate predicted assessments, scores, or grades for each retailer link in online content created and uploaded by content creators 112. The monetization engine 140 may generate the predicted assessments, scores, or grades using any suitable method, including for example, statistical methods such as logistic regression, artificial intelligence, and machine learning models, etc.

The generate predicted assessments, scores, or grades generated by monetization engine 140 may include, for example, a numeric score formatted, e.g., as a whole number, as a percentage, as a fraction, as a decimal, etc., a letter grade such as the familiar report card letter scores on a scale of A to F with or without pluses and minuses, or any other indicator of relative quality, such as a number of plus signs, minus signs, checkmarks, thumbs up or thumbs down symbols, etc.

In one embodiment, monetization engine 140 may provide guidance to creator 112 prior to publishing online content created and uploaded by content creator 112. To provide such guidance, monetization engine 140 may examine each retailer product link in the online content, perform an assessment of the retailer product link, identify alternative retailer product links for identical or equivalent products, perform an assessment of each alternative retailer product link, and present the assessments, which may include, for example, retailer monetization parameters applicable to each retailer product link, a generated assessment, score, or grade for each retailer product link, and an estimated commission earned by the creator for customer purchases generated from each retailer product link. The assessments may be performed according to creator preferences 165.

The generated retailer link assessments may be presented to creator 112 by way of a monetization dashboard 150, which may be generated by user interface generator 145. Through monetization dashboard 150, creator 112, may select an alternative retailer product link to replace the original retailer product link in the uploaded creator content in order to, for example, optimize monetization of the retailer product link, or to further any other goal of creator 112. For example, monetization dashboard 150 may provide creator 112 with information indicating that an alternative product link directing to a different retailer or brand may yield a higher earning potential for a similar or identical product sold elsewhere, thus allowing creator 112 to decide to incorporate the alternative product link in online content. This may also assist in the detection of links for products that are no longer sold, no longer in stock, or for which the retailer product link has been changed or otherwise invalidated. In this way, the retailer product link may be redirected to a retailer product link of more value to creator 112. Embodiments of monetization dashboard 150 are discussed in further detail below with respect to FIGS. 5 and 6. A method of providing guidance to creator 112 according to one or more embodiments is discussed in further detail below with respect to FIG. 3.

In another embodiment, monetization engine 140 may work autonomously to optimize monetization of retailer product links in uploaded creator content. For example, at the time the creator content is accessed by a consumer, and before the creator content is presented to the consumer, monetization engine 140 may examine each retailer product link in the online content, perform an assessment of the retailer product link, identify alternative retailer product links for identical or equivalent products, and perform an assessment of each alternative retailer product link. Based on the generated assessments, monetization engine 140 may select an alternative retailer product link to replace the original retailer product link in the uploaded creator content in order to, for example, optimize monetization of the retailer product link, or to further any other goal of creator 112, such as may be specified in creator preferences 165. This may also assist in the detection of links for products that are no longer sold, no longer in stock, or for which the retailer product link has been changed or otherwise invalidated. In this way, the retailer product link may be redirected to a retailer product link of more value to creator 112, and/or of more value to consumer 110. In addition to or instead of being performed when a consumer accesses the content, this process may be performed periodically on a set schedule, such as daily, weekly, monthly, or may be performed on-demand, such as if changes to certain retailer product links are known to have occurred. A method of autonomously optimizing monetization of retailer product links for creator 112 according to one or more embodiments is discussed in further detail below with respect to FIG. 4.

As used herein, a machine learning model is a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine learning model may operate on an input linearly, in parallel, via a network (e.g., a neural network), or via any suitable configuration.

The execution of the machine learning model may include deployment of one or more machine learning techniques, such as transfer learning, linear regression, logistical regression, random forest, gradient boosted machine (GBM), deep learning, and/or a deep neural network. Supervised and/or unsupervised training may be employed. For example, supervised learning may include providing training data and labels corresponding to the training data. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

In one embodiment, the machine learning model employed by monetization engine 140 may be a multi-layered neural network. Retailer monetization data may be retrieved from databases 125 (i.e., from retailer monetization data 180) and/or scraped from websites and contents published by online retailers 130 and/or contents published on content sharing platforms 135. Alternatively, retailer monetization data may be provided directly by online retailers 130, such as through a web interface or application programming interface (API), etc. Current retailer monetization data for a retailer product link in a creator web page, data regarding past customer transactions, associated past retailer monetization data, and resulting creator commissions may be passed into separate layers of the multi-layered neural network before being processed in a final output layer (e.g., a final output), which returns an assessment, score, or grade for the current retailer monetization data for the retailer product link in the creator web page. The machine learning model may incorporate a custom loss function that understands differences between an assigned assessment, score, or grade for a customer transaction and the actual creator commissions earned, and may weight losses based on such differences. In some embodiments, the machine learning model may include one or more specific hierarchical machine learning algorithms that further improve the accuracy of predicted assessments, scores, or grades (rather than merely adapting the loss function).

The machine learning model may be a trained neural network model. The machine learning model may be trained on a dataset of past customer transactions, the predicted assessments, scores, or grades for those transactions, and actual creator commissions for the transactions. The methods described herein may be implemented by the computer server 120 to create a model dataset used for the training of the machine learning model to predict assessments, scores, or grades for transactions, taking into account a priori information associated with past transactions and predictions. This allows for the prediction assessments, scores, or grades for transactions using proprietary algorithms which implement theoretical deduction rather than relying on human experience or observation.

A neural network may be software representing the human neural system (e.g., cognitive system). A neural network may include a series of layers termed "neurons" or "nodes." A neural network may comprise an input layer, to which data is presented, one or more internal layers, and an output layer. The number of neurons in each layer may be related to the complexity of a problem to be solved. Input neurons may receive data being presented and then transmit the data to the first internal layer through connections' weight. Any suitable type of neural network may be used.

The user interface generator 145 may generate one or more user interfaces, such as a creator preferences user interface 155, a user preferences user interface 160, and a monetization dashboard 150. Details of monetization dashboard 150, according to one or more embodiments will be discussed in detail below with respect to FIGS. 5 and 6.

User preferences user interface 160 may allow a user, such as consumers 110, to set general preferences for interactions with content sharing platforms 135 and/or the application. In addition, consumers 110 may set shopping preferences such as, for example, payment methods, shipping addresses, favorite retailers, brands or designers, other retailers, brands or designers to be avoided, favorite colors and sizes of clothing items, home or office décor preferences, etc.

Content creator user interface 155 may allow content creator 112 to set preferences for posting and monetization of retailer links in online content. For example, content creator 112 may set preferences for preferred retailers, brands or designers, other retailers, brands or designers to be avoided, weighting and selection of monetization parameters, payment preferences, etc.

FIG. 2 depicts a relationship diagram highlighting the basic relationship connections among various elements that enable online sales within a system infrastructure for dynamic link redirection, according to one or more embodiments. As depicted, product designers and manufacturers 202 have relationships with online retailers (or advertising affiliates) 130, who market and oftentimes sell the designer/manufacturer 202 products. Relationships here may be varied. For example, a clothing designer 212 might have an exclusive relationship with a single advertising affiliate 138, while a handbag designer 218 might have relationships with multiple advertising affiliates (138 and 134).

Likewise, affiliate retailers 130 maintain relationships with affiliate networks 220, with some affiliates 130 having different levels of relationships with different affiliate networks 220. In general, retailers 130 typically have exclusive agreements with a particular affiliate network 220, allowing the affiliate network to handle its affiliate advertisements exclusively. However, other retailers 130 may maintain this exclusivity with a given affiliate network 220 by region, having multiple networks/regions. For example, a particular affiliate 138 might have stores in North America, Asia, and Europe; with the North American region represented by one affiliate network 226, the Asia region represented by another affiliate network 224, and the Europe region represented by yet another affiliate network 222. Different regions may have different product offerings, and while some products from a particular affiliate 130 may be available over multiple regions other products may only be available in a single region. The structure and interoperation of these relationships is well understood by one of ordinary skill in the relevant art and requires no additional explanation.

The link generation server 120 may also be registered with any number of affiliate networks 220. It is well understood that affiliate networks 220 provide affiliate network advertiser links to online retailers 130 product webpages. Such affiliate network advertiser links allow for efficient tracking of online transactions related to affiliate network advertiser-linked products, which allows for the gathering of associated metrics for analytical and compensation purposes. For example, an affiliate network 220 can track metrics including page views (or "impressions"), purchases, click-throughs, etc., for subsequent use in determining product popularity, inventory needs, demographic and geographic concentrations, etc. Tracking is possible because of the use of web browser cookies, device fingerprinting, or other identifying mechanisms used in conjunction with the affiliate network advertiser link syntax, which provides a link that, when clicked on by a visitor, redirects the visitor's browser through the affiliate network 220 servers However, because products and product availability frequently change, not every designer/manufacturer 202 product is present in the affiliate networks as an affiliate network advertiser link. For that reason, the link generation server 120 maintains relationships 240 directly with online retailers 130 to allow for the dynamic creation of affiliate network affiliate network advertiser link URLs that achieve a similar/improved result as affiliate network 220 when provided with affiliate network advertiser links. These dynamically created affiliate network advertiser link URLs redirect a visitor through the link generation server 120, an affiliate network 220, and onto an advertiser affiliate 130 webpage. Thus, tracking may occur at each point. The dynamically created affiliate network advertiser link URLs are provided to any number of content creators 112 for embedding of the link in a blog, posting, tweet, profile, or any other online form of communication in which hyperlinks and webpage redirects may be utilized.

Casual online visitors (for example, Internet users) typically access a publisher's embedded affiliate network advertiser link when, for example, the visitor encounters the embedded affiliate network advertiser link in the publisher's blog posting. Using common page redirects, cookies, and the like, the link generation server 120 tracks the visitor's request and transaction through an affiliate network 220 and onto a webpage of an affiliate 130. Because the link generation server 120 maintains relationships with a plurality of affiliate networks 120, it is possible for the link generation server 120 to provide and track more affiliate network advertiser links than the sum total of the affiliate networks 220 combined. Moreover, because the link generation server 120 algorithms allow affiliate network advertiser link URL creation regardless of an affiliate network's 220 affiliate network advertiser link syntax, it is possible for publishers to utilize the link generation server 120 to access any affiliate network 220 through a single hyperlink, either shortened or not shortened, without concern for the affiliate network advertiser link syntax. Thus, the operation of the link generation server 120 provides a publisher with a consistent single source of affiliate network advertiser link URLs irrespective of the number of different affiliate networks that are involved. When shortened, the affiliate network advertiser link URL includes no direct visual indication regarding the affiliate network to which the advertiser belongs.

In yet another embodiment is the arrangement in which the link generation server 120 is hosted directly on or by an affiliate network 220 server. In this embodiment, an affiliate network 220 may have exclusive agreements with particular online retailers 130, and may still dynamically generate affiliate network advertiser URLs for affiliates when the affiliate network does not have an exclusive agreement. For example, consider that the affiliate network 226 has an exclusive agreement with two online retailers 138 and 136. The affiliate network 226 may still provide dynamic affiliate network advertiser URL links to products offered by third party retailer 134 (and others) by using the link generation server described herein. One of ordinary skill will appreciate that given the modular nature of the computer system hardware upon which the system described herein operates, such an arrangement is inherent in the previous embodiments as disclosed and described.

Monetization engine 140 may utilize information about relationship connections among product designers and manufacturers 202, online retailers (or advertising affiliates) 130, and affiliate networks 220 to perform identification of alternative retailer product links and to generate assessments of each retailer product link.

Figure 3:
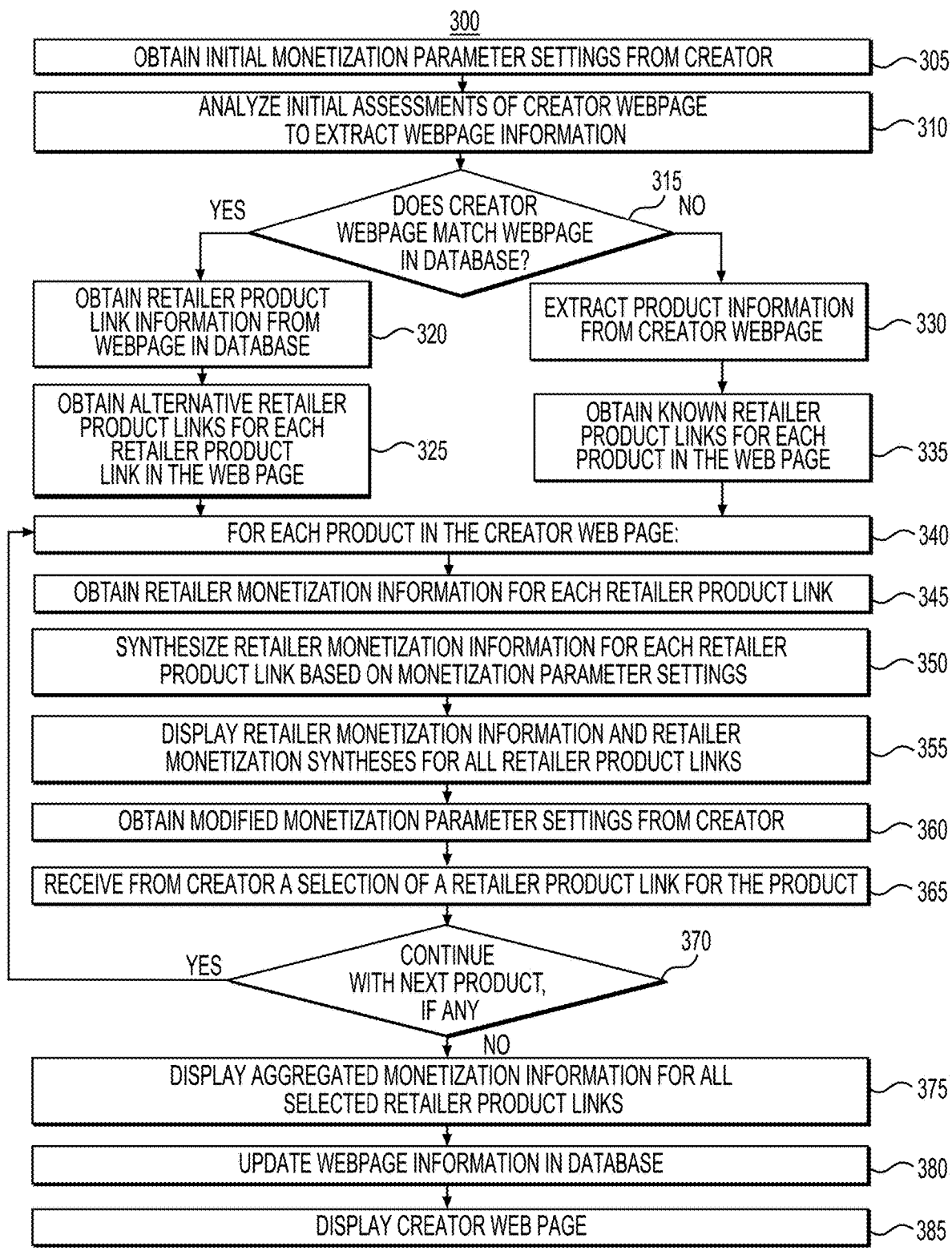
FIG. 3 depicts a flowchart of a method of dynamic link redirection, according to one or more embodiments.

FIG. 3 depicts a flowchart of a method of dynamic link redirection, according to one or more embodiments. As shown in FIG. 3, in operation 305, the monetization server may obtain initial monetization parameter settings from the creator of a web page. In operation 310, the monetization server may analyze initial assessments of the creator webpage to extract webpage information. In operation 315, the monetization server may determine whether the creator webpage matches a webpage in the database.

If the creator webpage matches a webpage in the database, then, in operation 320, the monetization server may obtain retailer product link information from the webpage in the database, and, in operation 325, the monetization server may obtain alternative retailer product links for each retailer product link in the web page. The monetization server may then continue to operation 340.

If the creator webpage does not match a webpage in the database, then, in operation 330, the monetization server may extract product information from the creator webpage, and, in operation 335, the monetization server may obtain known retailer product links for each product in the webpage. The monetization server may then continue to operation 340.

Beginning with operation 340, the monetization server may process each product in the creator web page. In operation 345, the monetization server may obtain retailer monetization information for each retailer product link. In operation 350, the monetization server may synthesize the retailer monetization information for each retailer product link based on monetization parameter settings. The synthesis may include generation of assessments, scores, or grades for each retailer product link. The monetization parameter settings may be based on preferences of the creator of the webpage. In operation 355, the monetization server may display to the webpage creator retailer monetization information and retailer monetization syntheses for all retailer product links. The retailer monetization information and retailer monetization syntheses may be displayed in a monetization dashboard, such as those describe below with respect to FIGS. 5 and 6. In operation 360, the monetization server may obtain, such as from the webpage creator, modified monetization parameter settings. In operation 365, the monetization server may receive, from the webpage creator, a selection of a retailer product link for the product. In operation 370, the monetization server may continue with next product, if any. If there are additional product links to process, then monetization server may return to operation 340. If there are no additional product links to process, then monetization server may continue to 375.

In operation 375, the monetization server may display aggregated monetization information for all of the selected retailer product links. In operation 380, the monetization server may update information about the webpage in the database. In operation 385, the monetization server may display the creator web page.

Figure 4:
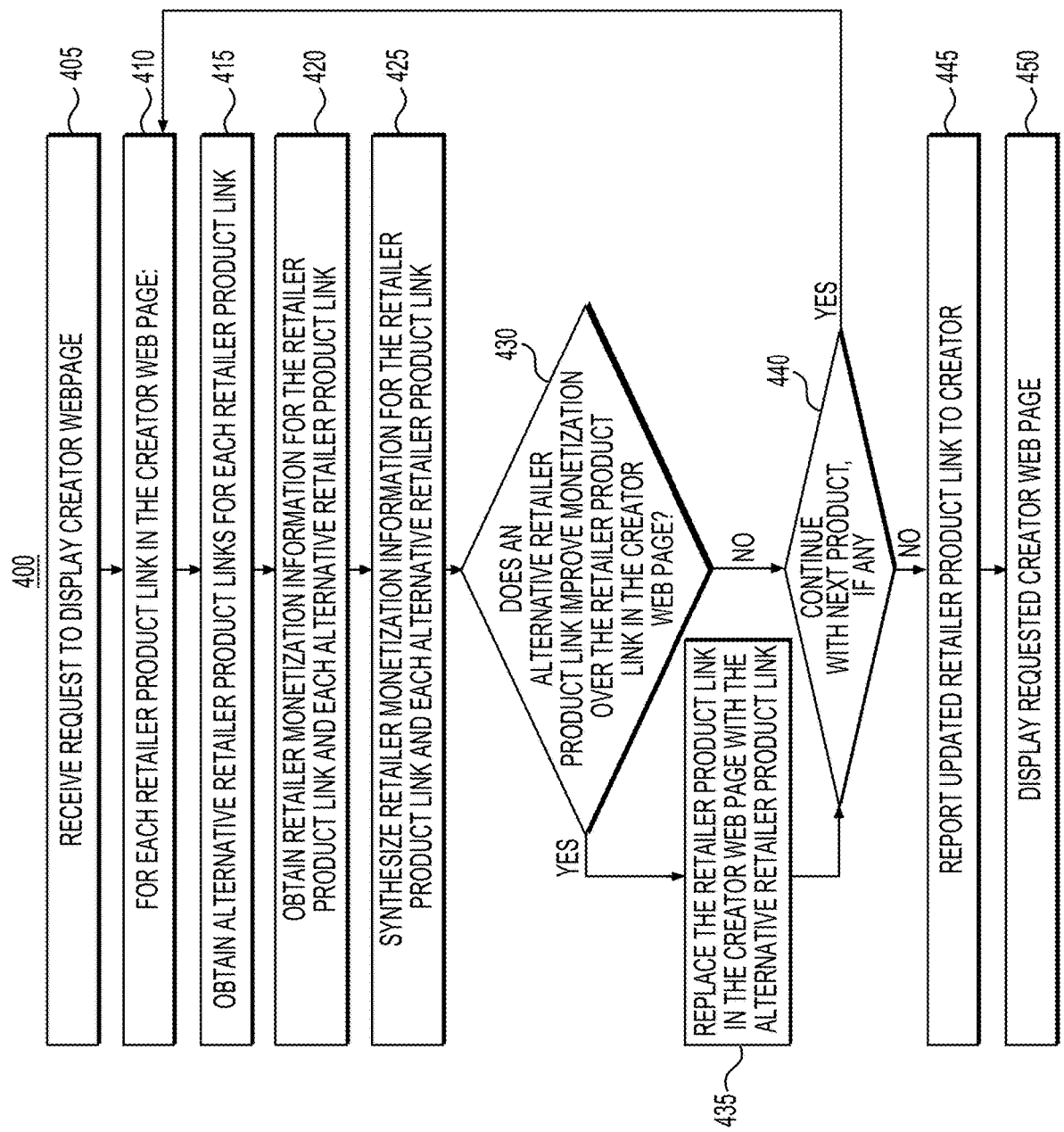
FIG. 4 depicts a flowchart of a method of autonomous dynamic link redirection, according to one or more embodiments.

FIG. 4 depicts a flowchart of a method of autonomous dynamic link redirection, according to one or more embodiments.

In operation 405, the monetization server may receive request to display a creator webpage. The request may come from, for example, a consumer 110 who may be looking for recommendations of products to purchase or from a content creator 112 to verify or review the creator webpage.

Beginning with operation 410, the monetization server may process each retailer product link in the creator web page. In operation 415, the monetization server may obtain alternative retailer product links for each retailer product link in the creator web page. In operation 420, the monetization server may obtain retailer monetization information for the retailer product link and each alternative retailer product link. In operation 425, the monetization server may synthesize retailer monetization information for the retailer product link and each alternative retailer product link. In operation 430, the monetization server may determine whether an alternative retailer product link improves monetization over the retailer product link in the creator web page. If the alternative retailer product link improves monetization over the retailer product link in the creator web page, then, in operation 435, the monetization server may replace the retailer product link in the creator web page with the alternative retailer product link.

In operation 440, the monetization server may continue with the next product link, if any. If there are additional product links to process, then monetization server may return to operation 410. If there are no additional product links to process, then monetization server may continue to 445.

In operation 445, the monetization server may report updated retailer product link to creator. In operation 450, the monetization server may display the requested creator web page, such as to a consumer. Subsequently, the consumer may select the retailer product link and purchase the product. In this case, the content creator may earn a commission determined by the retailer monetization parameters.

As discussed above, attempts by a consumer or other user to access retailer product links for products that are no longer sold, no longer in stock, or for which the retailer product link has been changed or otherwise invalidated, may put additional processing burdens on the computer servers of the retailer, affiliate network, online content publisher, etc. Through the assessments and link redirection discussed above with respect to one or more embodiments, the disclosed methods may update or remove the defective links and, thus, may reduce the processing burden on the computer servers of the retailer, affiliate network, online content publisher, etc. The reduction in processing burden may result in the computer servers of the retailer, affiliate network, online content publisher, etc. performing more efficiently.

As discussed above, monetization engine 140 may generate retailer link assessments or syntheses to be presented to creator 112 by way of a monetization dashboard 150, which may be generated by user interface generator 145. Through monetization dashboard 150, creator 112 may, for example, select an alternative retailer product link to replace the original retailer product link in the uploaded creator content in order to, for example, optimize monetization of the retailer product link, or to further any other goal of creator 112. Two exemplary embodiments of monetization dashboard 150 are depicted in FIGS. 5 and 6.

Figure 5:
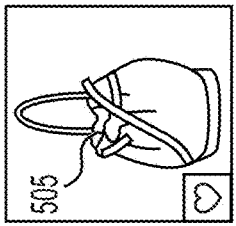
FIG. 5 depicts a user interface in a method of dynamic link redirection, according to one or more embodiments.
Figure 6:
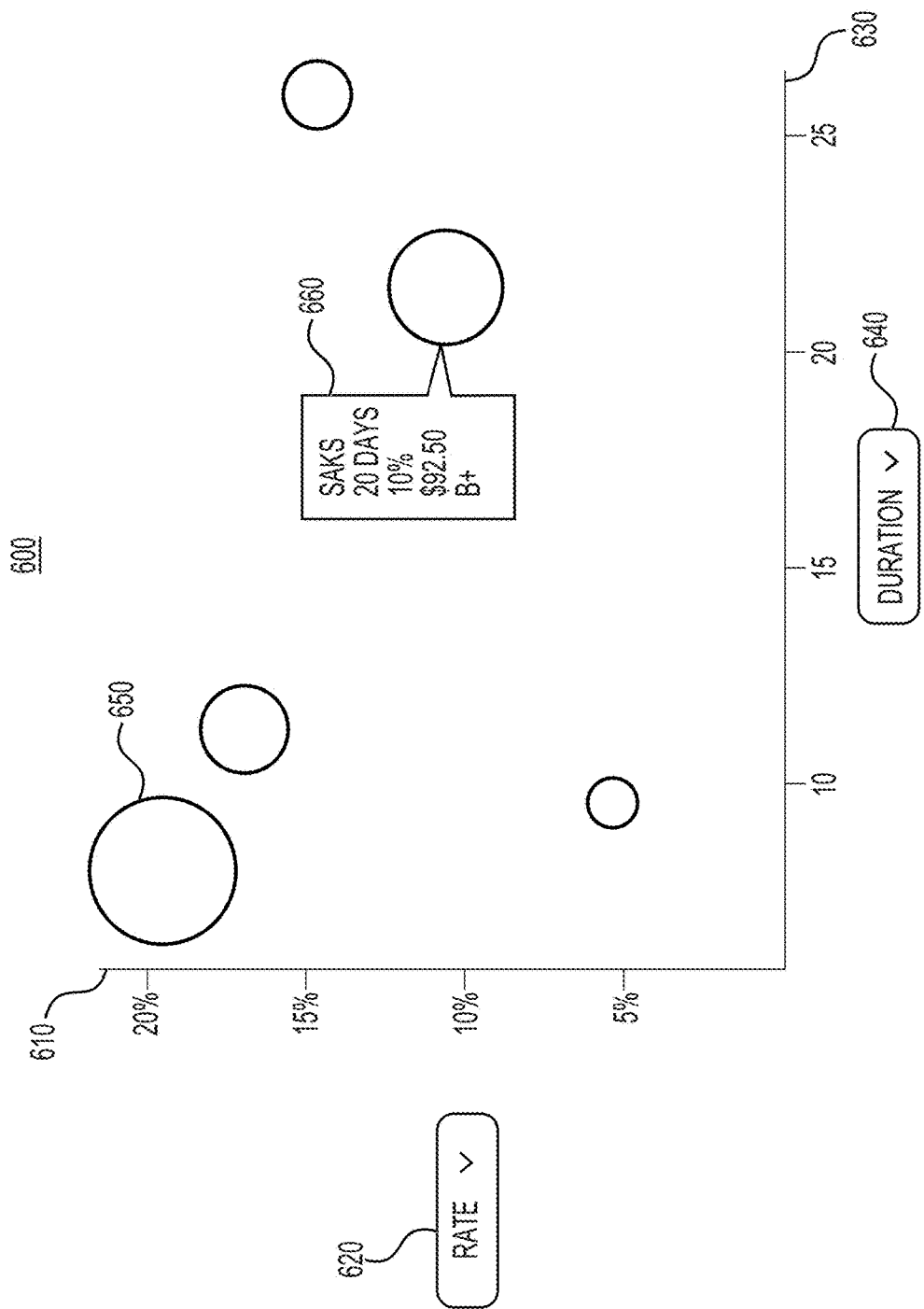
FIG. 6 depicts a user interface in a method of dynamic link redirection, according to one or more embodiments.

FIG. 5 depicts a first exemplary embodiment of a user interface 500 for optimizing monetization in a method of dynamic link redirection, according to one or more embodiments. As shown in FIG. 5, monetization dashboard 150 may present to creator 112, retailer monetization information for a product 505 depicted, mentioned, described, or otherwise featured in online content posted by creator 112. For the current retailer link, a record of retailer monetization information 580 may include a retailer monetization score 515 generated by monetization engine 140, the retailer name 520, a commission rate 525a and commission rate duration 530a, a retailer stock level for product 505, and an estimated commission to creator 112 for sales generated from a link in online content posted by creator 112. As shown in FIG. 5, an additional commission rate 525b and commission rate duration 530b may also be presented. A checkbox 510 may indicate that the current retailer link will be maintained in the online content. Creator 112 may select user interface element 575 for general information about how score 515 is generated, and may select user interface element 570 for detailed information about the score for the current retailer link.

As discussed above, monetization engine 140 may identify alternative retailer product links for identical or equivalent products and perform an assessment of each alternative retailer product link. The alternative retailer product links may be presented in a list 545 of records for each alternative retailer link. Each record in list 545 may include the same retailer monetization information as is displayed for current retailer link 580. Creator 112 may change the sort order for list 545 through a user interface element, such as through a selector 550, by clicking on list columns, etc. If creator 112 wishes to change to one of the alternative retailer product links, checkbox 510 for the desired retailer product link may be selected. Other methods for selecting a retailer product link may be contemplated, such as, for example, selecting and highlighting the desired retailer product link. Content creator 112 may save the selected retailer product link through a user interface element, such as a button 560, keyboard shortcuts, or other mode of user interaction. User interface elements may be presented for navigating through the products in the online content, including, for example, user interface element 555 to go back to a previous product and user interface element 565 to go to the next product.

In addition to presenting score 515 textually, monetization dashboard 150 may indicate a monetization assessment of each retailer link through other visual means such as, for example, text color, text background color, shading, or highlighting, etc., text animation, such as blinking, etc., text decorations, such as badges, checkmarks, emojis, emoticons, etc.

FIG. 6 depicts a second exemplary embodiment of a user interface for optimizing monetization in a method of dynamic link redirection, according to one or more embodiments. In particular, FIG. 6 depicts a user interface 600 summarizing an assessment, generated by monetization engine 140, of a current retailer product link and alternative retailer product links for a product 505 depicted, mentioned, described, or otherwise featured in online content posted by creator 112. As shown in FIG. 6, a user may select a retailer monetization parameter for X axis 630, such as by way of selector 640, and a retailer monetization parameter for Y axis 610, such as by way of selector 620. For each retailer product link, user interface 600 may include a user interface element or icon 650 representing the retailer product link placed according to the retailer monetization parameters selected for the X and Y axes. The appearance of user interface element or icon 650 may be modified according to a third retailer monetization parameter. For example, the size, shape, or visual aspects of interface element or icon 650 may be modified to give an intuitive understanding of the third retailer monetization parameter. In one non-limiting example, if the third retailer monetization parameter is the retailer monetization score 515 generated by monetization engine 140, the size of user interface element or icon 650 may be changed to reflect retailer monetization score 515, such as, for example, a larger size representing a higher retailer monetization score 515 and a smaller size representing a lower retailer monetization score 515. Alternatively, different colors, highlighting, visual style, shape, etc., may be used to indicate relative values of the selected third retailer monetization parameter for each user interface element or icon 650. The selected third retailer monetization parameter and the treatment of user interface element or icon 650 may be determined by default by user interface generator 145, or may be determined according to user preferences. In addition, if a user selects a user interface element or icon 650, additional details 660 regarding the associated retailer monetization parameters.

User interface 600 may also be employed to select a retailer product link to be included in online creator content. For example, when first presented to a user, a user interface element or icon 650 associated with the current retailer product link may be indicated, such as by highlighting, color, shape, badges or other icons, etc. A user may select a different retailer product link, such as, for example, by double-clicking, other selections using the mouse, keyboard, or other input device.

The methods and user interfaces disclosed herein may empower a user, such as a content creator, to understand monetization of product links within online content, and may allow the user to have an intuitive understanding of relative assessments of alternative retailer product links in order to quickly and efficiently select a retailer product link that suits the user's goals. In addition, the methods disclosed herein may allow for autonomous optimization of retailer product links each time online content is presented to a user. Together, these features may provide for better optimization of the monetization of retailer product links within online content.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for dynamic link redirection, the method comprising:
   obtaining, from a database, information regarding a current content link linking to a product sold by a first merchant;
   obtaining a plurality of alternative content links, each alternative content link linking to the product sold by a merchant other than the first merchant;
   generating a plurality of alternative assessments for each alternative content link among the plurality of alternative content links based on respective alternative assessment parameters for the alternative content link;
   determining a selected content link linking to the product sold by a second merchant other than the first merchant among the plurality of alternative content links;
   replacing the current content link linking to the product sold by the first merchant with the selected content link linking to the product sold by the second merchant other than the first merchant; and
   updating the information regarding the current content link in the database.

2. The computer-implemented method of claim 1, wherein the plurality of alternative assessments are each one of a score, a grade, or an estimated commission earned by a creator of online content for customer purchases.

3. The computer-implemented method of claim 1, wherein the alternative assessment parameters include one or more of a commission rate, a commission duration, and a retailer stock level.

4. The computer-implemented method of claim 1, wherein the plurality of alternative assessments are each further generated based on assessment preferences of a creator of online content.

5. The computer-implemented method of claim 4, wherein the assessment preferences of the creator of the online content includes one or more of preferences for preferred retailers, preferences for preferred brands, preferences for preferred designers, retailers to be avoided, brands to be avoided, designers to be avoided, weighting and selection of monetization parameters, and payment preferences.

6. The computer-implemented method of claim 1, wherein determining a selected content link among the plurality of alternative content links is based on comparing a respective estimated commission of each alternative assessment among the plurality of alternative assessments.

7. The computer-implemented method of claim 1, further comprising:
   obtaining current assessment parameters for the current content link; and
   generating a current assessment for the current content link based on the current assessment parameters,
   wherein determining the selected content link is based on the current assessment and the plurality of alternative assessments.

8. A system for dynamic link redirection, the system comprising:
   a data storage device storing instructions for dynamic link redirection in an electronic storage medium; and
   a processor configured to execute the instructions to perform a method including:
   obtaining, from a database, information regarding a current content link linking to a product sold by a first merchant;
   obtaining a plurality of alternative content links, each alternative content link linking to the product sold by a merchant other than the first merchant;
   generating a plurality of alternative assessments for each alternative content link among the plurality of alternative content links based on respective alternative assessment parameters for the alternative content link;
   determining a selected content link linking to the product sold by a second merchant other than the first merchant among the plurality of alternative content links;
   replacing the current content link linking to the product sold by the first merchant with the selected content link linking to the product sold by the second merchant other than the first merchant;
   updating the information regarding the current content link in the database; and
   updating the information regarding the current content link in the database.

9. The system of claim 8, wherein the plurality of alternative assessments are each one of a score, a grade, or an estimated commission earned by a creator of online content for customer purchases.

10. The system of claim 8, wherein the alternative assessment parameters include one or more of a commission rate, a commission duration, and a retailer stock level.

11. The system of claim 8, wherein the plurality of alternative assessments are each further generated based on assessment preferences of a creator of online content.

12. The system of claim 11, wherein the assessment preferences of the creator of the online content includes one or more of preferences for preferred retailers, preferences for preferred brands, preferences for preferred designers, retailers to be avoided, brands to be avoided, designers to be avoided, weighting and selection of monetization parameters, and payment preferences.

13. The system of claim 8, wherein determining a selected content link among the plurality of alternative content links is based on comparing a respective estimated commission of each alternative assessment among the plurality of alternative assessments.

14. The system of claim 8, wherein the system is further configured for:
obtaining current assessment parameters for the current content link; and
generating a current assessment for the current content link based on the current assessment parameters,
wherein determining the selected content link is based on the current assessment and the plurality of alternative assessments.

15. A non-transitory machine-readable medium storing instructions that, when executed by a computing system, causes the computing system to perform a method for dynamic link redirection, the method including:
obtaining, from a database, information regarding a current content link linking to a product sold by a first merchant;
obtaining a plurality of alternative content links, each alternative content link linking to the product sold by a merchant other than the first merchant;
generating a plurality of alternative assessments for each alternative content link among the plurality of alternative content links based on respective alternative assessment parameters for the alternative content link;
determining a selected content link linking to the product sold by a second merchant other than the first merchant among the plurality of alternative content links;
replacing the current content link linking to the product sold by the first merchant with the selected content link linking to the product sold by the second merchant other than the first merchant;
updating the information regarding the current content link in the database; and
updating the information regarding the current content link in the database.

16. The non-transitory machine-readable medium of claim 15, wherein the plurality of alternative assessments are each one of a score, a grade, or an estimated commission earned by a creator of online content for customer purchases.

17. The non-transitory machine-readable medium of claim 15, wherein the alternative assessment parameters include one or more of a commission rate, a commission duration, and a retailer stock level.

18. The non-transitory machine-readable medium of claim 15, wherein the plurality of alternative assessments are each further generated based on assessment preferences of a creator of online content.

19. The non-transitory machine-readable medium of claim 18, wherein the assessment preferences of the creator of the online content includes one or more of preferences for preferred retailers, preferences for preferred brands, preferences for preferred designers, retailers to be avoided, brands to be avoided, designers to be avoided, weighting and selection of monetization parameters, and payment preferences.

20. The non-transitory machine-readable medium of claim 15, wherein determining a selected content link among the plurality of alternative content links is based on comparing a respective estimated commission of each alternative assessment among the plurality of alternative assessments.

* * * * *